United States Patent Office 2,879,302
Patented Mar. 24, 1959

2,879,302

POLYFLUOROPERHALOETHYLENE-DIPHOSPHINES

David C. England, Wilmington, and George W. Parshall, Newark, Del., assignors to E. I. du Pont de Nemours and Company, Wilmington, Del., a corporation of Delaware No Drawing. Application August 21, 1957
Serial No. 679,528

8 Claims. (Cl. 260—606.5)

This invention relates to a new class of organophosphorous compounds. More particularly, the invention is directed to polyfluoroperhaloethylenediphosphines and to their preparation.

The hydrocarbylphosphines are fairly well-known compounds, but very little is known of the hydrocarbyldiphosphines. Even less is known of the halocarbyl- and particularly the fluorocarbylphosphines. In fact, based on analogy with what is known of the corresponding compounds of the next preceding member of group V-A of the periodic table, as given in Deming's "General Chemistry," 5th ed. (1944), John Wiley & Sons, Inc., i.e., nitrogen, it would be predicted that such compounds would be difficultly accessible and very likely quite unstable, especially in those instances where hydrogen was present on the phosphorus. Thus, fluorocarbylamines, wherein fluorine is present on carbon directly linked to nitrogen carrying hydrogen, are very unstable—see, for instance, Rapp et al., J. Am. Chem. Soc. 72, 3646 (1950). Only one such compound, bis-(trifluoromethyl)amine, has been reported and it is known to be readily hydrolyzable—see Barr et al., J. Chem. Soc. 1955, 2532.

Recently, Bennett et al. (J. Chem. Soc., 1954, 9538) disclosed the preparation of mono-, bis-, and tris(trifluoromethyl)phosphines by the reduction of the corresponding iodo(trifluoromethyl)phosphines with, variously, hydrogen or lithium aluminum hydride. The reaction is far from satisfactory, and the products obtained are not hydrolytically stable. Furthermore, the iodophosphine intermediates are obtained in an obviously expensive and difficult to handle reaction involving the treatment of silver trifluoroacetate with iodine and reaction of the trifluoromethyliodide thus obtained directly with elemental phosphorus.

Surprisingly, we have now found that the polyfluoroperhaloethylenediphosphines in which there are two phosphorus atoms, each bearing two hydrogen atoms, directly linked to separate carbon atoms, the two carbon atoms carrying at least two fluorine atoms, not only exist, but are rather stable compounds with good resistance to hydrolysis. Furthermore, these compounds can be readily prepared by the direct addition of phosphine to the requisite polyfluoroperhaloethylene.

Our invention is, accordingly, generic to polyfluoroperhaloethylene-1,2-diphosphines, wherein the two carbons carry at least two fluorine atoms, with the remaining two valences of said carbons being satisfied by halogen and especially by halogen of atomic number no greater than 35. Particularly outstanding because of the necessary polyfluoroperhaloethylene intermediates being more readily available are the polyfluoroperhaloethylenediphosphines in which the two carbons carry at least two fluorine atoms, with the remaining two valences of the carbons being satisfied by linkage to a halogen of atomic number 9–17.

The compounds of this invention, thus, can be represented by the following structural formula:

wherein the X's, which can be alike or different, are used to represent halogens, at least one of which is always fluorine, especially those of atomic number 9–35, and most preferably those of atomic number 9–17.

The present invention is also generic to the preparation of these new polyfluoroperhaloethylenediphosphines by the direct interaction of the requisite polyfluoroperhaloethylene, i.e., a compound having the formula

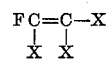

wherein the X's, which can be alike or different, represent halogens, at least one of which is fluorine, and phosphine, or an in situ precursor thereof under the conditions of reaction, such as a mixture of phosphorus and hydrogen. The phosphine reactant can be supplied per se and is, in fact, available commercially in passable stages of purity. Alternatively, the phosphine can be generated in situ in the reaction zone from white phosphorus and hydrogen.

Because of the spontaneously inflammable nature of the products and the phosphine intermediate, the reaction should be carried out under oxygen-free conditions, most conveniently in a closed reactor. The reaction can be carried out batchwise or continuously, although for ease of operation the former is generally preferred.

The reaction can be carried out under elevated or reduced pressures, depending on the relative concentration of the reactants, the temperature being used, the contact time, the free space volume of the reactor, and the like, all of which variables are well known in the art for gas-phase reactions. The process of this invention can be carried out at temperatures in the range 100–200° C. under pressures of about 500 lb./sq. in. When operating at lower pressures the reaction temperature should generally be raised, and at atmospheric pressure or thereabouts the reaction is carried out at temperatures generally not appreciably above 250° C. due to the competing dimerization of the polyfluoroperhaloolefin. Lower temperatures of the order of room temperature to 100° C. will be found effective when the reaction is operated at higher pressures, e.g., 20, 50, or 100 atmospheres or the like.

Because of the frequently unpredictable behavior of the polyfluoroolefins, precautions known in the art should be practiced when superatmospheric pressures are being used in the reaction.

The reaction vessels themselves must not only be capable of withstanding pressures generated at the operating temperatures and concentrations involved, but also must be fabricated of materials unreactive with the reactants and the product at the temperatures employed. Such materials are well known in the chemical processing art. They include metallic platinum and platinum-lined vessels, and cheaper and more common equipment fabricated from or lined with a commercially available alloy of nickel, iron, and molybdenum known to the trade as Hastelloy C. Glass reaction equipment or glass-lined metal reactors are likewise usable.

The reaction mixture resulting from the addition of the polyfluoroperhaloolefin to the phosphine is worked up very simply by direct distillation under oxygen-free conditions. In practice, any gaseous by-products are removed from the reactor by distillation at reduced pressures and reduced temperatures or, alternatively, by distillation at room temperature. The products of the reaction, that is, the polyfluoroperhaloethylenediphosphines, are liquid at atmospheric pressure and room temperature. So, also, are the contaminants, i.e., the mono-, bis-, and tris(polyfluoroperhaloethyl)phosphines. Generally two distillations serve to provide the desired polyfluoroperhaloethylenediphosphines in an analytical degree of purity.

The reaction can be effected properly in the presence or absence of an inert organic reaction medium which, if present, should be oxygen-free and anhydrous. Any inert liquid organic diluent can be used, and generally speaking the most common are the normally liquid hydrocarbons and polyhalo-, particularly polyfluorohydrocarbons, including aliphatic and aromatic compounds such as the hexanes, heptanes, octanes, and the like; benzene; toluene, the xylenes, and the like; cycloaliphatic hydrocarbon solvents such as cyclohexane and the like; polyhalo-, particularly polyfluoroaliphatic hydrocarbons, e.g., 1,1,2,2-tetrafluoro-3,3-dimethylbutane and the like; polyhalo and particularly polyfluoroaliphatic/cycloaliphatic hydrocarbons, e.g., perfluorodimethylcyclohexane and the like. The choice of the particular diluent is not at all critical and will vary with such other normal variables as the reaction temperature found necessary. In most instances in order to simplify the reaction and the isolation and purification of the product, no diluent is used.

The new polyfluoroperhalophosphines of this invention are generically clear, colorless liquids spontaneously inflammable in air. The boiling points of the products range from the lowest boiling at about 70° C. at atmospheric pressure (tetrafluoroethylenediphosphine) to the highest boiling (the symmetrical and unsymmetrical dibromodifluoroethylenediphosphines), which boil above 200° C. at atmospheric pressure. The boiling points of the various liquid products increase with the increase in molecular weight of the halogen substituents on the ethylene bridge joining the two $PH_2$ units. These diphosphines exhibit good hydrolytic stability under both aqueous acid and aqueous base conditions. They are soluble in inert organic liquid diluents, such as the normally liquid hydrocarbons and polyfluorocarbons, particularly the perfluorocarbon solvents. They are, however, insoluble in water and solutions containing high percentages of water.

Because of the spontaneous inflammability thereof, these new polyfluoroperhaloethylenediphosphines should always be handled under an inert atmosphere, such as nitrogen, argon, helium, carbon dioxide, and the like. In any event, the diphosphines must be handled under rigorously oxygen-free conditions, preferably also under anhydrous conditions, so as to prevent any problems of significant partition and precipitation of the water-insoluble diphosphines.

The spontaneous inflammability of the new diphosphines is probably the most significant property which they possess and permits use in a wide range of outlets where controlled flammability is desired. Thus, the polyfluoroperhaloethylenediphosphines of the present invention find generic utility as ignition agents in that they permit controlled ignition of combustible materials by incorporation therein and subsequent exposure to the atmosphere whenever ignition is desired. Thus, the polyfluoroperhaloethylenediphosphines serve as desirable ignition agents for insecticidal smoke pots of the type used in insect control practices in citrus fruit orchards and the like. They are particularly desirable in such outlets in view of the phosphorus and fluorine substituents which, on combustion, generally lead to products of desirable utility in control of insects.

The polyfluoroperhaloethylenediphosphines are also useful in an entirely unrelated field in that they are ligands useful in the formation of metal chelates. The chelate-forming tendencies of the diphosphines are normally to form bidentate chelates. The diphosphines thus are useful in winning metals from the ores thereof and in purifying otherwise difficult to purify metals. The diphosphines on oxidation are converted to the corresponding polyfluoroperhalophosphonic acids, which are difficultly obtainable if at all by other routes. These polyfluoroperhaloalkene bisphosphonic acids are, in themselves, useful as extreme pressure lubricants, cutting oils, and the like.

The following examples, in which the parts given are by weight, are submitted to further illustrate the invention but not to limit it.

*Example I*

A thick-walled, cylindrical glass reactor, roughly 24 diameters long and of total internal capacity corresponding to 130 parts of water, was cooled in a liquid nitrogen bath and charged with six parts of tetrafluoroethylene and two parts of phosphine. The reactor was then sealed and heated to 50° C. After four hours at this temperature, the reactor and its contents were allowed to cool to room temperature. The contents were gaseous, thereby indicating no reaction had been effected. The sealed reactor was then reheated to a temperature of 150° C. and held at this temperature for eight hours. The reactor was then cooled to liquid nitrogen temperature and opened to an atmosphere of nitrogen. The opened reactor was then allowed to warm to room temperature to remove any unreacted tetrafluoroethylene, phosphine, and possible by-product tetrafluoroethylene dimer. The remaining liquid product was transferred to a stillpot under nitrogen and distilled through a precision fractionation column. Two major liquid fractions were obtained, one exhibiting hydrogen and fluorine resonance peaks in a nuclear magnetic resonance spectrum consistent with the structure tetrafluoroethylphosphine, i.e., $HCF_2CF_2PH_2$, and the other, boiling at approximately 60° C. at room temperature and atmospheric pressure, exhibiting hydrogen and fluorine resonance peaks consistent with the structure tetrafluoroethylenediphosphine, i.e., $$H_2PCF_2CF_2PH_2$$

Each of eight heavy-walled glass reactors similar to that described above but varying in having an internal capacity corresponding to 165 parts of water was charged with nine parts of tetrafluoroethylene and three parts of phosphine at liquid nitrogen temperatures. The reactors were then sealed and heated under autogenous pressure at 150° C. for eight hours. The reactors were then cooled to liquid nitrogen temperature, opened, and allowed to warm to about −80° C. under reduced pressure, whereby unreacted phosphine and tetrafluoroethylene, as well as any gaseous byproducts, were removed. The remaining liquid reaction products were combined and distilled under reduced pressure into a stillpot and then fractionated through a precision fractionation column packed with glass helices. There was thus obtained 33 parts of 1,1,2,2-tetrafluoroethylphosphine as a clear, colorless liquid boiling at 20–22° C., four parts of 1,1,2,2-tetrafluoroethylene-1,2-diphosphine as a clear, colorless liquid boiling over the range 69–79.5° C., and three parts of bis(1,1,2,2-tetrafluoroethyl)phosphine as a clear, colorless liquid boiling at 91–92° C.

The crude 1,1,2,2-tetrafluoroethylene bisphosphine was redistilled under an atmosphere of nitrogen through a spinning band distillation column of the type fully described and claimed in U.S. Patent 2,712,520. There was thus obtained 2.5 parts of pure 1,1,2,2-tetrafluoroethylenediphosphine as a clear, colorless liquid, boiling at 69–72° C. with the bulk distilling at 71.5° C. at atmospheric pressure.

*Analysis.*—Calc'd for $C_2H_4F_4P_2$: C, 14.5%; H, 2.4%; P, 37.3%. Found: C, 16.0%; H, 2.4%; P, 32.1%.

Examination of the nuclear magnetic resonance spectrum of the purified product showed it to be identical with that described immediately above with the spectrum consistent with the diphosphine structure. Mass spectrometric analysis showed the product to have a mass of 166 versus a calculated molecular weight of 166.01.

Example II

Each of eight heavy-walled glass reactors of the type previously described varying in being of internal capacity corresponding to 150 parts of water was charged with nine parts of chlorotrifluoroethylene and three parts of phosphine at liquid nitrogen temperature. The reactors were sealed and heated under autogenous pressure at 150° C. for eight hours. The reactors were then cooled to liquid nitrogen temperature, opened, and allowed to warm to about −80° C. under reduced pressure, thereby removing any unreacted starting materials or gaseous by-products. The combined liquid products were transferred by distillation under reduced pressure into a stillpot and then fractionated through a column packed with glass helices under an atmosphere of nitrogen. There was thus obtained three parts of trifluorochloroethane as a clear, colorless liquid boiling at 20–23° C., 45.4 parts of 2-chloro-1,1,2-trifluoroethylphosphine as a clear, colorless liquid boiling at 67° C., 0.5 part of 2-chloro-1,1,2-trifluoroethylenediphosphine as a clear, colorless liquid boiling over the range 109–129° C., and 5.2 parts of bis(2-chloro-1,1,2-trifluoroethyl)phosphine as a clear, colorless liquid boiling at 138–142° C. The 2-chloro-1,1,2-trifluoroethylenediphosphine was purified by fractionation through a spinning band distillation column. There was thus obtained 0.2 part of pure 2-chloro-1,1,2-trifluoroethylenediphosphine as a clear, colorless liquid boiling at 105–109° C. The proton magnetic resonance spectrum of the product was consistent with the diphosphine structure. Mass spectrometric analysis indicated the mass of the product to be 182, 184. These values are consistent with the values calculated for $C_2H_4ClF_3P_2$ when the two isotopes of chlorine are considered.

In addition to the polyfluoroperhaloethylenes illustrated in detail in the foregoing examples, there can also be used in the process of the present invention such other polyfluoroperhaloethylenes as 1,2-dichloro-1,2-difluoroethylene, i.e., symmetrical dichlorodifluoroethylene in both the cis and trans forms; 1,1-dichloro-2,2-difluoroethylene, i.e., unsymmetrical dichlorodifluoroethylene; bromotrifluoroethylene; 1,2-dibromo-1,2-difluoroethylene, i.e., symmetrical dibromodifluoroethylene in both the cis and trans forms; 1,1-dibromo-2,2-difluoroethylene, i.e., unsymmetrical dibromodifluoroethylene, and the like.

Using the aforesaid illustrative examples of the polyfluoroperhaloethylene reactants in the process of the present invention, as illustrated in the foregoing detailed examples, there can be obtained by reaction with phosphine or precursors thereto further additional specific polyfluoroperhaloethylenediphosphines of the present invention. Thus, from symmetrical dichlorodifluoroethylene and phosphine, there is obtained 1,2-dichloro-1,2-difluoroethylenediphosphine; from unsymmetrical dichlorodifluoroethylene and phosphine, there is obtained 1,1-dichloro-2,2-difluoroethylenediphosphine; from bromotrifluoroethylene and phosphine, there is obtained 1-bromo-1,2,2-trifluoroethylenediphosphine; from symmetrical dibromodifluoroethylene and phosphine, there is obtained 1,2-dibromo-1,2-difluoroethylenediphosphine; from unsymmetrical dibromodifluoroethylene and phosphorus and hydrogen, there is obtained 1,1-dibromo-2,2-difluoroethylenediphosphine and the like.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

We claim:

1. Polyfluoroperhaloethylene-1,2-diphosphines wherein the two carbon atoms carry at least two fluorine atoms and the remaining two valences of said carbon atoms being satisfied by halogens of atomic number no greater than 35.

2. A polyfluoroperhaloethylene - 1,2 - diphosphine of claim 1 wherein said halogens have atomic number of from 9 to 17.

3. 1,1,2,2-tetrafluoroethylenediphosphine.

4. 2-chloro-1,1,2-trifluoroethylenediphosphine.

5. A process for preparing polyfluoroperhaloethylenediphosphines which comprises reacting phosphine and a polyfluoroperhaloethylene having the formula

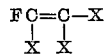

wherein the X's represent halogens having atomic numbers no greater than 35, at least one of which is fluorine.

6. Process of claim 5 wherein phosphine is formed in situ from white phosphorus and hydrogen.

7. Process of claim 5 wherein the X substituents are halogens having atomic numbers of from 9 to 17.

8. A process which comprises reacting phosphine and a polyfluoroperhaloethylene, said ethylene compound having at least two fluorine substituents, the remaining two valences of the ethylenic carbons being satisfied by halogen having an atomic number no greater than 35, and recovering the polyfluoroperhaloethylenediphosphine so produced by direct distillation under oxygen-free conditions.

No references cited.